(Model.)

W. R. MUSSER.
TOBACCO PACKING MACHINE.

No. 314,539. Patented Mar. 24, 1885.

WITNESSES

INVENTOR
Wm. R. Musser
by C. A. Snow & Co
Attorneys (Model.) 2 Sheets—Sheet 2.

W. R. MUSSER.
TOBACCO PACKING MACHINE.

No. 314,539. Patented Mar. 24, 1885.

WITNESSES
W. W. Mortimer.
E. G. Siggers.

Wm. R. Musser
INVENTOR
by C. A. Snow & Co
Attorneys

UNITED STATES PATENT OFFICE.

WILLIAM R. MUSSER, OF LEFTWICH, VIRGINIA.

TOBACCO-PACKING MACHINE.

SPECIFICATION forming part of Letters Patent No. 314,539, dated March 24, 1885.

Application filed June 11, 1884. (Model.)

*To all whom it may concern:*

Be it known that I, WILLIAM R. MUSSER, a citizen of the United States, residing at Leftwich, in the county of Campbell and State of Virginia, have invented a new and useful Tobacco-Packing Machine, of which the following is a specification, reference being had to the accompanying drawings.

This invention has relation to machines for packing smoking-tobacco and other materials of a like form; and it consists in the construction and novel arrangement of parts, as will be hereinafter fully described, and particularly pointed out in the claims.

Figures 1, 7:
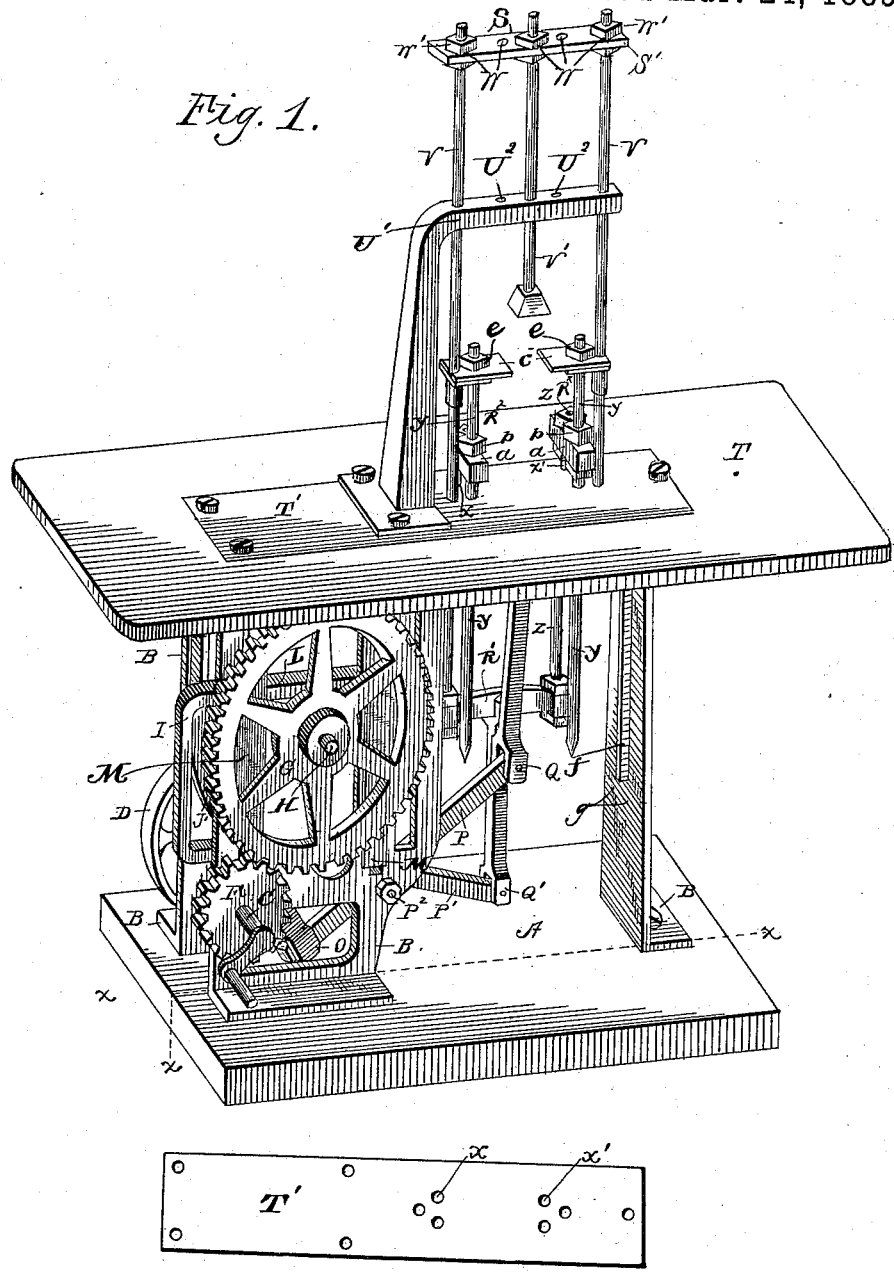
Figure 2:
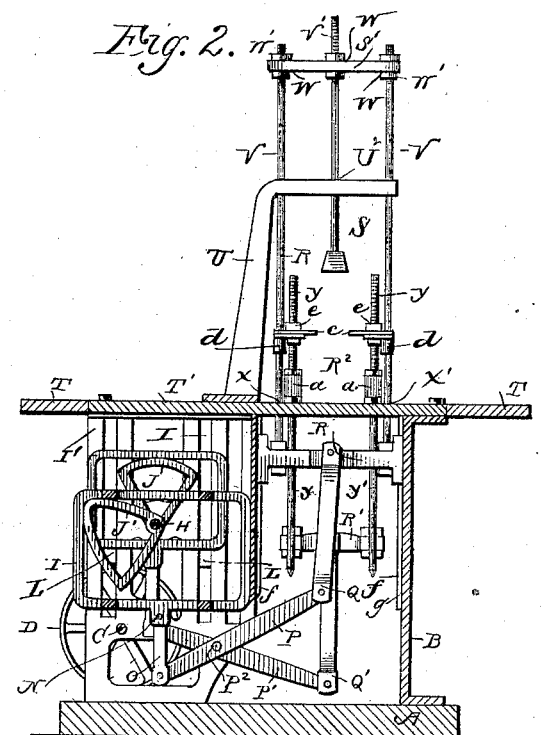
Figure 3:
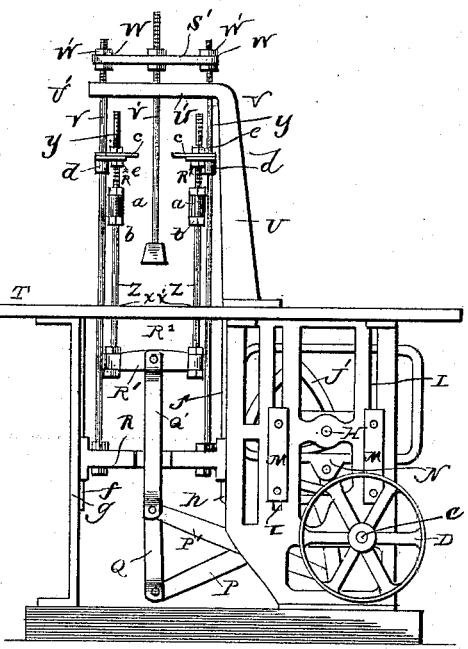
Figure 4:
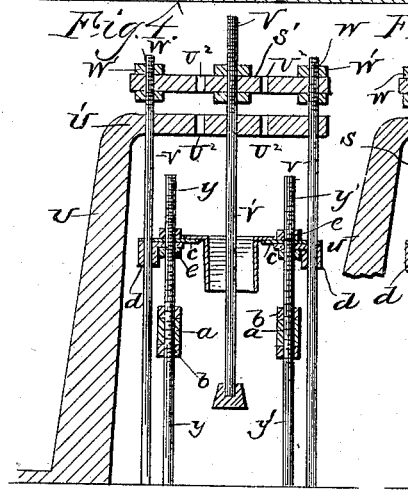
Figure 5:
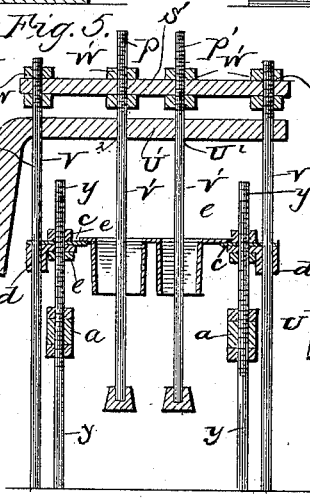
Figure 6:
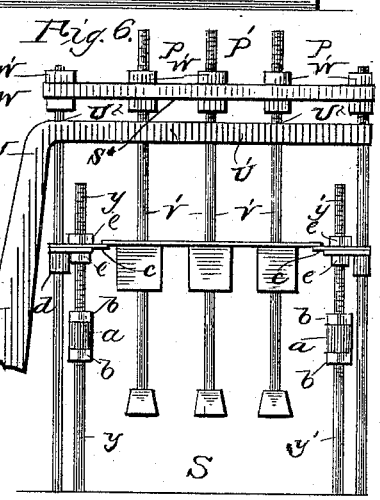

Figure 1 is a view in perspective of a tobacco-packing machine embodying my improvements. Fig. 2 is a vertical longitudinal section on the line $x\ x$ in Fig. 1. Fig. 3 is a side elevation, and Fig. 4 is a sectional detail view, of the standard and the top cross-head, showing the perforations for the additional plunger-rods. Fig. 5 illustrates a modification. Fig. 6 is also a modification. Fig. 7 is a detailed plan view of the perforated guide-plate.

Referring by letter to the accompanying drawings, A designates the bed-plate or floor, to which the feet of the frame B are bolted to give the frame greater stability.

C designates the power-shaft of the machine, which is provided with a band-wheel, D, at one end, and a small cog-wheel, F, near the other end, of said shaft C. The cog-wheel F meshes with a larger cog-wheel, G, on the end of a shaft, H, having bearings in the frame B between the guideways I. The shaft H is provided with two sector-shaped cams, J and J', fixed thereon between the sides of the frame, and projecting from said shaft H in opposite directions, as shown. These cams J J' work in rectangular sash-frames L L', secured to slides M, working in the guideways I, and provided with bearing-lugs N on their lower sides, in which are pivoted the upper ends of short arms O. The cams J J' are caused to reciprocate the sash-frames in their guideways I as they revolve, and operate the levers and plungers connected to the plunger-frames. The lower ends of these short arms O are bifurcated to receive the power ends of the levers P P', fulcrumed on a shaft, P², in the frame B. The weight ends of the levers P P' are pivoted in the bifurcated lower ends of vertical arms Q Q', the bifurcated upper ends of which are pivoted to the lower cross-heads, R R', of the mold-lifting frame R² and the plunger-frame S. The table T is provided with a central metal plate, T', which is secured to and forms the top of the frame B. From this plate T' rises a standard, U, which has a horizontal arm, U', provided with a series of vertical perforations, U², for the passage of the guide-rods V V and the plunger-rod V' or rods of the plunger-frame S. The top cross-head, S', of the plunger-frame is provided with a corresponding series of vertical perforations, W, in which the upper ends of the guide-rods V V and the plunger-rod V', or rods, are adjustably secured by jam-nuts W' on the threads of said rods, above and below the upper cross-head, S'. The plate T' is perforated for the passage of the guide-rods V V, which extend down below the table, and are secured in vertical perforations in the wide lower cross-head, R, by jam-nuts, as shown. The plate T' is also provided with vertical perforations X and X', for the passage of the guide-rods $z$ and the adjustable guide-rods $y$ of the mold-lifting frame R². The rods $z$ and the adjustable rods $y$ (when the machine is in its normal position) are connected just above the plate T' by yokes $a\ a$, held in place by jam-nuts $b$ above and below said yokes. The rods $y$ project down through perforations in the cross-head R of the plunger-frame S, and also project upward through perforations in the adjustable sliding lifter-plates $c\ c$, having vertically-perforated lugs $d$, through which the guide-rods V V are passed, and these plates $c\ c$ are held to their adjustments on the rods $y$ by jam-nuts $e$ above and below the plates $c\ c$. The rods $z$ of the mold-lifting frame R² pass down to and are secured in vertical perforations near the ends of the lower narrow cross-head, R', of the frame R², it being the only cross-head for said frame R². The ends of the cross-head R are grooved vertically to receive the guides $f$ on the opposed faces of the uprights $g$ and $h$ of the frame B.

In the modification illustrated in Fig. 5 I have shown the machine provided with two plungers and their lifter-plates; and in Fig. 6 a portion of the machine is shown with three plungers and lifter-plates. The object of duplicating or triplicating these parts is that I may be enabled to pack two bags or packages at one stroke of the plunger-frame S, or I may pack three bags or packages at one stroke of the plunger-frame.

When two plunger-rods and plungers are used, as seen in Fig. 5, the rods $p\ p'$ are secured in the upper cross-head of the plunger-frame S in the same manner as has been described for the single plunger-rod. When more than one mold or funnel is used, they should be secured with blocks between and a band around them with projecting flanges on outsides, so that one pair of slides may lift the whole as one, as shown in Figs. 5 and 6. There being a variety of forms and sizes of packages desired, I make the larger packages single, the smaller double, and the smallest triple.

The machine may be operated from one or both sides, as the packages may be placed in from and taken out from either or both sides, as there is no obstruction between the lifting-plates.

The operation of the machine is quite simple, and is as follows: In their normal positions the plunger-frame is elevated and the mold-lifting frame is depressed. A bag or bags of cloth or paper, or cloth and paper combined, are drawn over the end of the open-bottomed mold or funnel, and the mold filled with tobacco or other material to be packed, and is placed in position on plates $c\ c$, the bottoms of the bags resting on plate T' to receive the pressure of the plunger or plungers entering the mold or funnel, which latter prevents the bags from being burst. While the pressure holds the package upon the plate T' the mold-lifting frame moves upwardly, the lifting-plates $c\ c$, engaging the flanges of the mold, draw the mold up out of the bag or package, after which the plunger ascends and instantly relieves the bag or package. The empty mold is then removed from the lifter-plates and an empty bag or package prepared for pressing is put in place, and the operation is repeated.

The operation, it will be observed, is effected by the sector-cams being rotated in the sash-frames to operate the pivoted levers which communicate the motion to their respective frames. The machinery arrests the movement of plunger-frame and the lifter-frame at the high and low points of their travel on each stroke, so that the mold may be put in position and removed with ease and safety. The wheels, levers, &c., are all beneath the table, so that the operator will not be endangered by them while feeding the press.

The machine is positive and efficient in operation, and is not likely to get out of order.

I am aware that a machine for packing tobacco having vertically-operating plungers and vertically-adjustable lifter-plates is not broadly new, and this, broadly, I disclaim.

Having thus fully described my invention, what I claim as new, and desire to secure by Letters Patent of the United States, is—

1. The combination, with the frame of the machine, the perforated plate and the standard U, having the perforated arm U', of the plunger-frame S and plunger, the mold-lifting frame $R^2$, provided with the vertically-adjustable lifter-plates $c\ c$, the levers connected to the lower cross-heads of said frames, the sash-frames connected to the levers and working in vertical guideways in the sides of the main frame, the shaft provided with sector-cams within the sash-frames, and means, substantially as described, for operating the cams, as set forth.

2. The combination, with the frame provided with vertical guideways in its sides, of the power-shaft C, provided with the small cog-wheel F, the shaft H, provided with the large cog-wheel G at one end and the sector-shaped cams J and J' on opposite sides of said shaft H between the sides of the frame B, the sash-frames L L', secured to slides M, working in guideways I in the sides of the frame B, the pivoted levers P P', connected to the sash-frames and to the lower cross-heads of the plunger and lifter frames, and the plungers and funnel-lifters, substantially as specified.

3. The combination of the plunger-frame composed of the guide-rods V V and cross-heads S and R, the lifter-frames composed of the rods $z\ z'$, the yokes $a\ a$, the cross-head R', and the rods $y\ y'$ adjustable vertically in the yokes, the lifter-plates secured upon the adjustable rods $y\ y'$, and sliding on the guide-rods V, and mechanism, substantially as described, for operating said frames, substantially as set forth.

In testimony that I claim the foregoing as my own I have hereto affixed my signature in presence of two witnesses.

WM. R. MUSSER.

Witnesses:
S. W. PATTERSON,
SAMUEL L. WRIGHT.